UNITED STATES PATENT OFFICE.

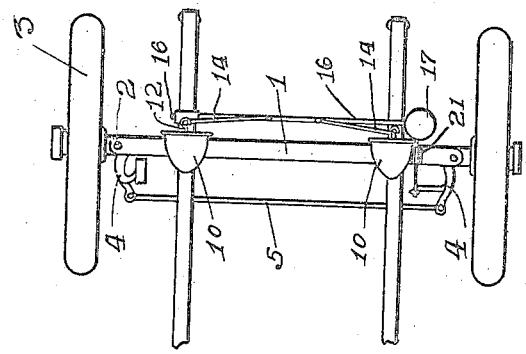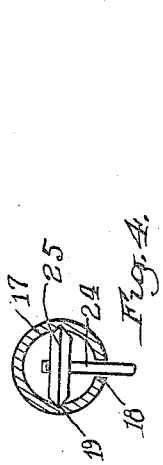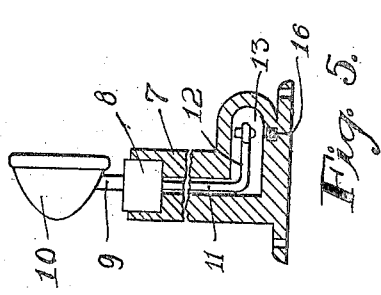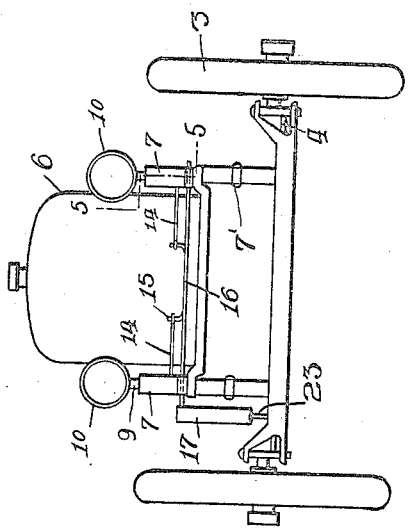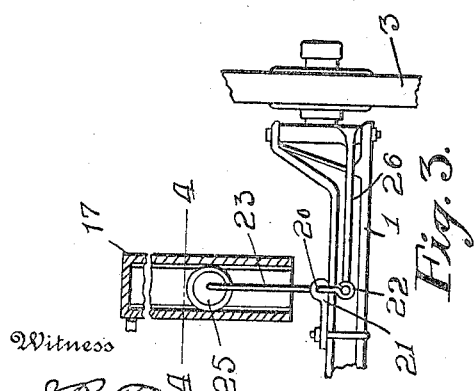

JAMES GLENNON, OF ROCHESTER, MINNESOTA.

DIRIGIBLE HEADLIGHT.

1,377,880.　　　　　Specification of Letters Patent.　　Patented May 10, 1921.

Application filed November 13, 1919. Serial No. 337,695.

*To all whom it may concern:*

Be it known that I, JAMES GLENNON, a citizen of the United States, residing at Rochester, in the county of Olmsted and State of Minnesota, have invented a new and useful Dirigible Headlight, of which the following is a specification.

This invention relates to dirigible headlights and is designed more especially as an improvement upon the structure disclosed in Patent No. 1,300,720 issued to me.

One of the objects of the invention is to simplify and otherwise improve upon the structure whereby relative movement of the vehicle body and the chassis will have no effect upon the means employed for transmitting motion to the headlight from the front wheels.

A further object is to provide a structure which can be applied readily to automobiles already in use, which is compact, will not detract from the appearance of a vehicle, and will operate efficiently under all conditions.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a front elevation of a vehicle having the present improvements combined therewith.

Fig. 2 is a plan view of the front portion of the vehicle.

Fig. 3 is a rear elevation of a portion of the front axle and showing the tubular member of the telescopic connection in section.

Fig. 4 is a section on line 4—4, Fig. 3.

Fig. 5 is an enlarged section on line 5—5, Fig. 1.

Referring to the figures by characters of reference 1 designates the front axle of a vehicle provided with the usual knuckles 2 to which the front wheels 3 are connected, it being understood that the knuckles have arms 4 connected by a cross rod 5 and which arms are adapted to be shifted by the usual steering wheel and the parts controlled thereby so as to turn the front wheels.

The vehicle body 6 is supported as ordinarily by means of springs 7' and, obviously, has an up and down movement relative to the axle 1. Mounted on the body 6 at each side of the front portion thereof is an upstanding casing or pedestal 7 in which is journaled a collar 8 formed on or secured to a stem 9 carrying headlights 10. The stem 9 has a downwardly projecting portion 11 within the pedestal provided with an arm 12 housed within an opening 13 in the base portion of the pedestal. Each of the arms 12 is provided with a link 14 and the two links are pivotally connected to fingers 15 upstanding from a cross rod 16 which is slidably mounted in the base portions of the pedestals 7. Thus it will be seen that when the rod 16 is shifted longitudinally in either direction motion will be transmitted therefrom through the links 14 to the respective arms 12, thus to cause the headlights 10 to swing to the right or to the left in unison.

One end of the rod 16 is secured to the upper end of a tubular casing 17 extending downwardly therefrom. This casing has a longitudinal slot 18 and formed in the inner wall of the casing at diametrically opposed points are longitudinal grooves 19.

A short shaft 20 is journaled in a suitable bearing 21 secured on the axle 1 and is provided at one end with a crank arm 22 while extending upwardly from its other end is an arm 23 having a stem 24 projecting through the slot 18 and into the casing 17. On this stem 24 is journaled a disk or roller 25 the periphery of which is adapted to project into the grooves 19 so that the roller can travel upwardly and downwardly within said casing 17 but the casing will be prevented from rotating. The crank arm 22 is connected to one of the arms 4 by a link 26 so that when the wheels 3 are turned to the right or to the left motion will be transmitted through link 26 to the crank arm 22 so as to cause the arm 23 to swing and produce a transverse movement of the casing 17 and the rod 16. Consequently the headlights will be swung about their vertical axes so as to turn in the direction in which the vehicle is moving. By reason of the roller connection between the arm 23 and the casing 17 the vehicle body can have an up and down movement relative to the axle 1 without disarranging the operative connection or interfering with the transmission of motion from the wheels 3 to the headlights.

What is claimed is:—

1. The combination with a vehicle including a front axle, wheels connected thereto and mounted to swing relative to the axle, and means for shifting said wheels, of a vehicle body supported by and movable relative to the axle, headlights carried by the body and adapted to rotate about vertical axes, a member carried by the body and shiftable transversely thereof, link connections between said member and the headlights for rotating the headlights in unison when the member is shifted, a longitudinally slotted tubular casing fixedly connected to and depending from said member, a shaft journaled on the axle, an arm movable with the shaft, a roller carried by said arm and movably mounted within the depending casing, and means for transmitting motion to said shaft when the wheels are shifted to steer the vehicle.

2. The combination with the front axle of a vehicle and the front wheels mounted to swing relative thereto, of a body yieldingly supported by the axle, pedestals upon the body at the sides thereof, stems journaled within the pedestals, headlights carried by the stems, crank arms extending from the stems, a cross rod slidable within the pedestals, link connections between the crank arms and the cross rod, a slotted casing fixedly connected to and depending from the rod, a shaft journaled on the axle, a crank arm at one end of the shaft, a connection between said crank arm and one of the wheels for shifting the arm and rotating the shaft when the wheels are turned in either direction, another arm extending from the shaft and into the slotted casing, and a roller carried by said arm and movably mounted within the casing, said casing having interior guides into which the roller projects.

3. The combination with a vehicle including a front axle and a yieldingly supported body, of pedestals at the sides of and carried by the body, a cross rod guided by the pedestals, lamps carrying stems journaled within the pedestals and having crank arms, link connections between the crank arms and the cross rod, front wheels mounted to swing relative to the axle, and means for transmitting motion from said wheels when swung, to the cross rod, said means including a slotted tubular member depending from the rod, a crank arm mounted to shift within said tubular member, a roller carried by the crank arm and within the tubular member, and a power transmitting connection between said crank arm and one of the wheels.

In testimony that I claim the foregoing as my own, I have hereto affixed my signature in the presence of two witnesses.

JAMES GLENNON.

Witnesses:
  I. L. ECKHOLDT,
  KATHRYN BAHMER.